Aug. 7, 1956  C. C. OTTINGER  2,757,630
REMOTE FOOT STEERING APPARATUS FOR BOATS
Filed Dec. 28, 1953
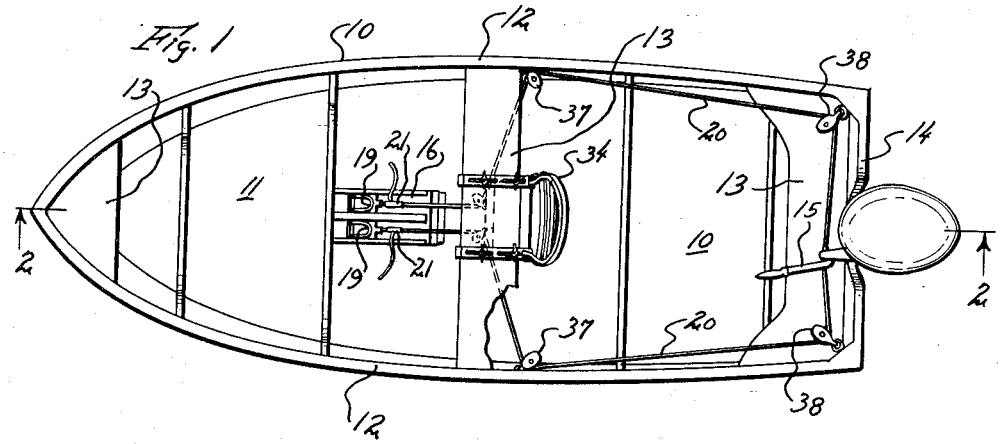
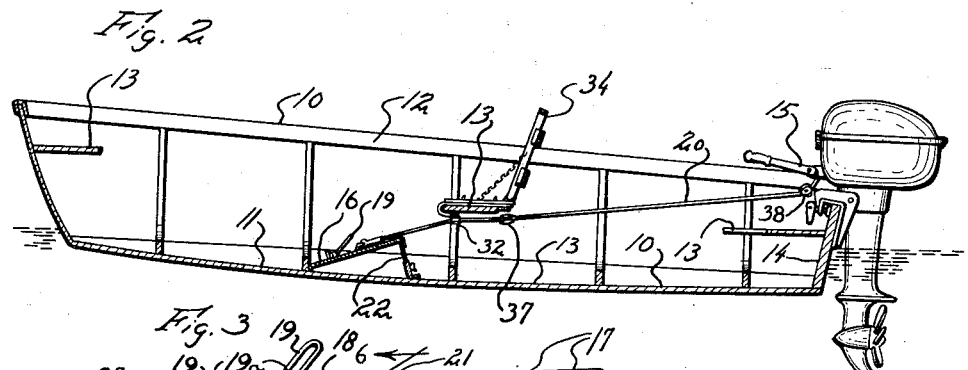
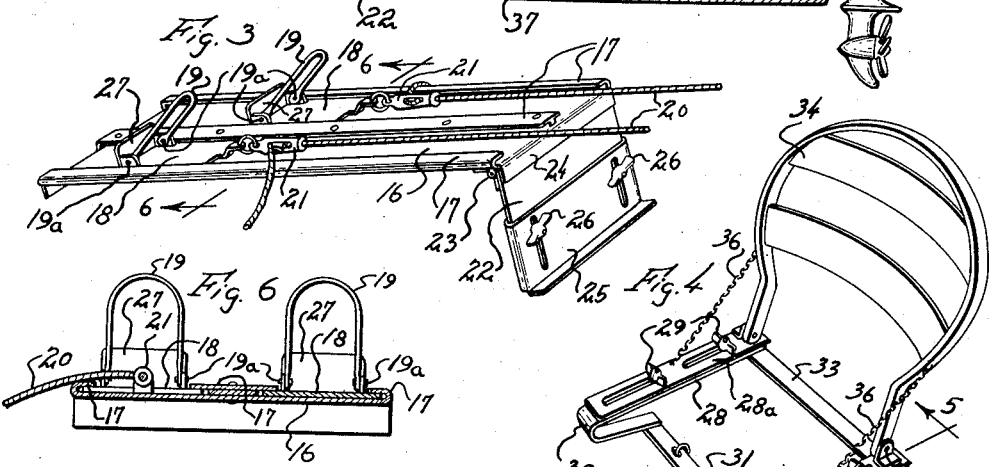
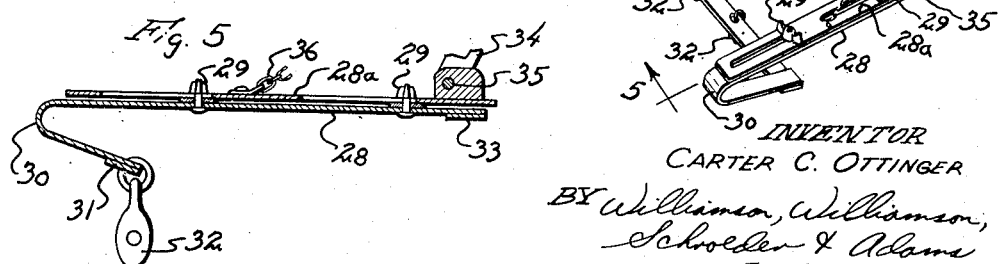
INVENTOR
CARTER C. OTTINGER
BY Williamson, Williamson,
Schroeder & Adams
ATTORNEYS

United States Patent Office 2,757,630
Patented Aug. 7, 1956

2,757,630

REMOTE FOOT STEERING APPARATUS FOR BOATS

Carter C. Ottinger, Canby, Minn.

Application December 28, 1953, Serial No. 400,465

3 Claims. (Cl. 114—153)

This invention relates to foot steering apparatus for steering a boat having an outboard motor or tiller.

Apparatus developed in the past for the steering of a boat by use of the feet have been generally cumbersome to use and expensive to manufacture in that such apparatus embodied many mechanical and moving parts. Known apparatus have the further disadvantage of not being easily and readily attachable to and detachable from the boat and, therefore, of not being readily removable from one position in a boat to another position. Existing apparatus and structures for the steering of a boat by use of the feet are not flexible enough to be adapted to installation in all kinds of boats. Such apparatus have further disadvantages in that they cannot be used from all positions in a boat and, therefore, do not give the operator a selectivity of positions from which to steer, nor may such apparatus be adjusted to the physical size of the operator of the boat and apparatus.

The general object of my invention is to provide a highly novel apparatus for steering a boat by use of the feet which may be inexpensively and easily manufactured.

Another object of my invention is to provide novel remote steering apparatus for a boat which will allow the operator thereof to carry on activities with his hands other than directing the boat.

A further object of my invention is to provide a novel boat steering apparatus for use of the feet which may be positioned to allow the operator thereof to select the position in which he shall sit and to position his weight in the boat at a location remote from the steering member.

A still further object of my invention is to provide a device for the remote foot steering of a boat which is portable and may be used in conjunction with any seat in the boat, thereby allowing the operator to select the location from which he steers.

A further object of my invention is to provide a remote foot steering device which may be placed in a boat so that the operator thereof may sit facing forwardly or rearwardly so as to allow him to more conveniently carry on other activities which require him to sit in a particular position.

A still further object of my invention is to provide a novel remote foot steering apparatus which is readily and easily attachable to and detachable from the boat, thus allowing the interchangeable use of one such apparatus in several boats.

A still further object of my invention is to provide a remote foot steering apparatus which is easily collapsible and compact and thus efficiently portable to transport the apparatus when used interchangeably between boats.

A further object of my invention is to provide a remote foot steering device or apparatus which is adjustably efficient to the length of the operator's legs, allowing him to adjust the distance between foot pedals and seat and to adjust the vertical positioning of the foot pedals.

These and other objects and advantages of my invention will more fully appear from the following description made in connection with the accompanying drawings wherein like reference characters refer to the same parts throughout the several views and in which:

Fig. 1 is a top view of a boat having an outboard motor installed thereon showing one embodiment of my invention including the platform, foot pedals and chair frame, and the connection between the steering foot pedals and outboard motor;

Fig. 2 is a cross sectional view taken at 2—2 in Fig. 1, showing the platform, pedals and chair frame and their relationship in the boat;

Fig. 3 is a perspective view of the inclined platform and its vertical support and foot pedals mounted on the platform and showing the direction of the tension lines connected to the foot pedals;

Fig. 4 is a perspective view of the chair frame which is used in combination with the platform and tension lines in steering the boat;

Fig. 5 is a cross sectional view taken at 5—5 of Fig. 4 showing the construction of the side frame members of the chair frame; and Fig. 6 is a cross sectional view taken at 6—6 in Fig. 3 showing the construction and assembly of the platform and foot pedals and mounting thereof.

One embodiment of my invention, as shown in the accompanying drawings, includes a boat 10 having a bottom 11, side portions 12, seats 13, stern portions 14, a motor, and a tiller steering member 15 or outboard motor steering member for positioning the rudder or outboard motor which acts to direct the course of the boat. I provide a platform 16 having one of its end portions resting on the bottom 11 of the boat 10 and which may be against one of the cross ribs of the boat 10. On the upper surface of the platform 16 are affixed at least two pair of channels 17, each channel being parallel to and spaced from the other channel in its respective pair, each of said channels 17 extending longitudinally of the platform 16. A pair of foot engaging elements is slidably mounted on the upper surface of the platform 16, each of said foot engaging elements including a foot rest member 18 made of thin, rigid, non-corrosive metal which is slidably mounted between a pair of opposed channels 17 so as to be slidable therein in a direction longitudinal of the platform 16 and a foot pressure lever 19 being pivotally attached to one end of the foot rest 18 by means of pivot pin 19a and adapted to oscillate through a restricted arc from a position substantially parallel to the foot rest 18 and adjacent thereto to a substantially vertical position. The foot pressure lever 19 is prevented from oscillating through a greater arc by means of stop member 27 which comprises an upturned flange affixed at the end of the foot rest 18.

A linear tension element such as a cord or cable 20 is attached to each of the foot pedals by any suitable means such as the connector 21 so that the tension member 20 may be adjusted as to its length at this connection.

A vertical support member brace 22 is pivotally attached to the other end of the platform 16 by means of the pivot pin 23. The lower end of the support member 22 rests upon the bottom of the boat, and thereby holds the end portion of platform 16 attached thereto in spaced relationship with the bottom of the boat, and causes the platform 16 to be inclined at an acute angle with respect to the bottom of the boat. Vertical support member 22 will oscillate through a restricted arc about pivot pin 23 from a position substantially parallel to the platform 16 and adjacent thereto to a substantially vertical position and will be prevented from oscillating through a greater arc by engagement with stop member 24 comprising a downwardly turned flange integral with platform 16. Support member 22 has a lower portion 25 slidably mounted thereon and connected thereto by means of bolts and wing-nuts 26 to adjustably fix the height of the vertical support member to a height convenient for the legs of the operator of the steering device.

I also provide a chair frame, as shown in perspective in Fig. 4, having side frame members 28 which have adjustable side frame extensions 28a adjustably fixed thereto by any suitable means which will affix the two together in a desirable adjusted position, such as by bolts and wing-nuts 29. On one end of the side frame members 28 are formed hooks 30 for engaging the boat seat 13 and holding the chair frame thereto. Affixed to the side frame members 28 is a cross bar 31 and, in one embodiment of my invention as shown, the bar 31 is affixed to the end of the side frame members 28 adjacent the open end of the hooks to extend between the side frame members in a position below the seat 13 when the chair frame is engaged therewith. Bar 31 has mounted thereon at least a pair of pulleys 32 for receiving and guiding the linear tension elements 20 which extend from the foot pedals toward the chair frame. The side frame members 28 are also spaced and braced by any other suitable means such as cross frame member 33. A back rest 34 is pivotally attached by means of pivot pins 35 to the ends of the side frame extensions 28a which are adjacent the ends of side frame member 28 opposite the ends having the hooks 30 formed therein. The back rest 34 may oscillate through a restricted arc about pivot pin 35 from a position substantially parallel and adjacent to side frame members 28 to a substantially vertical position, the back rest 34 being prevented from oscillating further by any suitable means such as chains 36 attached to the side frame extension 28a.

In the form of my invention shown, the chair frame is mounted on a boat seat 13 and positioned so that the operator may rest against the back rest 34 and face forwardly, the platform 16 is placed on the bottom of the boat and extending longitudinally thereof at a locus forward of the boat seat 13 and having the end of the platform 16 which is spaced above the bottom of the boat by means of vertical support member 22 closest to the seat 13 and chair frame. The linear tension elements 20 extend from the foot pedals rearwardly of the boat and toward the chair frame and extend through and engage the pulleys 32 and thence laterally of the boat toward the sides 12 to and through guiding pulleys 37, and thence to and through the stern pulleys 38 and to the steering member 15 to which they are affixed. The linear tension element 20 must be adjusted in length so as to be taut between the foot pedals and the steering member. Movement of the foot pedals will cause a displacement of the linear tension elements 20 and will cause steering member 15 to oscillate about the pivotal axis of the rudder or motor boat.

The operator sits on the boat seat 13 and on the chair frame resting against the back rest 34 and has his legs extended longitudinally of the boat toward the platform 16 and has his feet resting upon foot rest 18 and the bottom of his feet against foot pressure levers 19, whereupon he may apply pressure to one of the foot pressure levers 19, displacing the corresponding foot rest and tension line forwardly, the other foot rest and tension line being displaced rearwardly. This displacement causes a movement of the steering member 15 which, in turn, causes the boat to alter its course.

It will be seen that the steering apparatus I provide is readily adaptable to be used in reverse position, counter to that shown in Fig. 1. In reverse position the chair frame would face rearwardly of the boat, the platform and foot pedals would be disposed adjacent to the chair frame and rearwardly thereof, the tension elements extending toward the chair frame and thence laterally of the boat to the side portions and thence to the stern portion and steering member. This will allow the operator of the boat to sit facing rearwardly of the boat if he desires, and will allow him to sit in the most forward seat of the boat where there is only limited room forwardly of such a seat.

It should also be noted that the steering apparatus comprising my invention is readily adaptable to be mounted upon a seat extending longitudinally of the boat and along the side portion of a boat, whereby the chair frame would be mounted on the seat in the same manner it is mounted on a cross seat and facing inwardly of the boat. When the chair frame is so mounted the operator who sits therein will face the longitudinal center line of the boat; the platform will be disposed adjacent to the seat and chair frame at a distance therefrom so that the operator sitting on the seat and chair frame may easily reach the foot pedals with his legs. In this form, the linear tension members will extend from the foot pedals to and through the pulleys mounted onto the chair frame, thence both tension members to the same side portion of the boat adjacent the chair frame and thence longitudinally of the boat to opposite ends of the stern portion and to the steering member.

It will be seen that I have provided, in my invention, a novel steering apparatus for a boat by which the operator thereof may do the steering by use of his feet instead of his hands, thereby freeing his hands for carrying on other types of activities such as fishing and hunting while he is in the boat. The operator may also select the position in the boat from which he desires to steer and may place the steering apparatus in any such position whether it be forward or rearward in the boat, whether it be facing forwardly or rearwardly of a boat having cross seats, or whether it be forward or rearward or adjacent either side in a boat having longitudinally disposed seats along the side portions thereof.

It will further be seen that my foot steering apparatus provides the operator of the boat with a great selectivity in the place and direction from which he chooses to steer the boat.

It will also be seen that I have provided that my steering apparatus may be easily and readily attached to and detached from the boat selected for use except for guide pulleys which may be permanently attached to the boat, which will not interfere with other activities or uses of the boat when the foot steering apparatus is not used. No attaching devices are used to affix my steering apparatus to the boat, thereby the use of tools is eliminated and installation of the apparatus will not damage the boat structure. It should also be noted that, when my apparatus is detached from a boat, it is foldable into small compass for ease and portability.

It will, of course, be understood that various changes may be made in the form, details, arrangement and proportions of the parts without departing from the scope of my invention.

What I claim is:

1. In apparatus for steering a boat having a bottom, a seat and a steering member; a portable foot-operable steering device comprising a platform adapted to be placed on the bottom of said boat adjacent to said seat at a suitable distance therefrom to enable the operator thereof to easily reach the same with his legs while sitting on the seat, a pair of foot engaging elements slidably mounted on said platform for parallel movement toward and away from said operator, said elements being adapted for connection to a tension line connected to said steering member, said platform having means for adjusting the elevation of an end thereof from the bottom of the boat thereby affording variable angles of thrust for said elements.

2. A portable foot-operable steering device as defined in claim 1, said elevation adjusting means including an adjustable brace hinged to said platform for folding thereagainst when not in use to facilitate handling and storage thereof.

3. In apparatus for steering a boat having a bottom, a seat board, a steering member and lines attached thereto; a portable foot-operable steering device comprising a line-operating platform unit adaptable for placing on said bottom adjacent said seat board at a suitable distance therefrom to enable the operator thereof to easily reach the same with his legs while sitting on said seat board, a pair of foot engaging elements slidably mounted for parallel movement toward and away from the operator and connected to said lines, a detachable frame unit adapted for mounting on the seat board and having means under said seat board for receiving and guiding said lines, and an adjustable support brace for one end of said platform unit to vary its inclination to the bottom as may be desired.

References Cited in the file of this patent

UNITED STATES PATENTS

| | | |
|---|---|---|
| 116,934 | Cutter | July 11, 1871 |
| 413,558 | Rice | Oct. 22, 1889 |
| 475,420 | Savage | May 24, 1892 |
| 2,309,159 | Binger | Jan. 26, 1943 |

FOREIGN PATENTS

| | | |
|---|---|---|
| 2,370 | France | Sept. 6, 1828 |
| 65,083 | Germany | Oct. 24, 1892 |
| 356,885 | Germany | Aug. 4, 1922 |